US012770234B2

(12) United States Patent
Jeon et al.

(10) Patent No.: US 12,770,234 B2
(45) Date of Patent: Oct. 20, 2026

(54) METHOD OF DEBLURRING MOTION IN LIGHT FIELD IMAGE AND DEVICE THEREFOR

(71) Applicant: Research & Business Foundation Sungkyunkwan University, Suwon-si (KR)

(72) Inventors: Byeungwoo Jeon, Seongnam-si (KR); Jaelin Lee, Seoul (KR); Younghyeon Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 289 days.

(21) Appl. No.: 18/437,436

(22) Filed: Feb. 9, 2024

(65) Prior Publication Data

US 2024/0273687 A1 Aug. 15, 2024

(30) Foreign Application Priority Data

Feb. 10, 2023 (KR) ........................ 10-2023-0018106

(51) Int. Cl.
*G06T 5/73* (2024.01)
*G06T 7/262* (2017.01)
(Continued)

(52) U.S. Cl.
CPC ................ *G06T 5/73* (2024.01); *G06T 7/262* (2017.01); *G06T 7/557* (2017.01);
(Continued)

(58) Field of Classification Search
CPC ............. G06T 5/73; G06T 2207/10052; G06T 2207/20201; G06T 5/70;
(Continued)

(56) References Cited

U.S. PATENT DOCUMENTS 9,100,514 B2 * 8/2015 Gu ............................ G06T 5/73
9,319,578 B2 * 4/2016 Jiang ......................... G06T 5/73
(Continued)

FOREIGN PATENT DOCUMENTS

KR 10-2023-0000154 A 1/2023
KR 10-2023-0000155 A 1/2023

OTHER PUBLICATIONS

Hahne, Christopher et al. "Baseline and Triangulation Geometry in a Standard Plenoptic Camera", Jan. 20, 2021, International Journal of Computer Vision, vol. 126, pp. 21-35. Retrieved from arXiv: <URL: https://arxiv.org/abs/2010.04638>. <DOI: https://doi.org/10.1007/s11263-017-1036-4>. (Year: 2021).*
(Continued)

*Primary Examiner* — Matthew C Bella
*Assistant Examiner* — Nicholas John Helco
(74) *Attorney, Agent, or Firm* — NSIP Law

(57) ABSTRACT

A deblurring method of an embodiment is a method for deblurring a motion in a light field image in a processing device including at least one processor, and includes a first step of modeling PSF for a sub-aperture image of an acquired light field image on the basis of optical parameters, and a second step of deriving an optimization code on the basis of the obtained PSF of each sub-aperture image.

9 Claims, 7 Drawing Sheets

(51) Int. Cl.
*G06T 7/557* (2017.01)
*H04N 23/957* (2023.01)
*H04N 25/615* (2023.01)

(52) U.S. Cl.
CPC ................................ *G06T 2200/21* (2013.01); *G06T 2207/10052* (2013.01); *G06T 2207/10144* (2013.01); *G06T 2207/20056* (2013.01); *G06T 2207/20201* (2013.01); *H04N 23/957* (2023.01); *H04N 25/615* (2023.01)

(58) Field of Classification Search
CPC ......... G06T 2207/20182; G06T 1/0007; G06T 5/10; G06T 5/80; G06T 7/0002; G06T 7/20; G06T 7/262; G06T 7/269; G06T 7/285; G06T 7/292; G06T 7/37; G06T 7/42; G06T 7/55; G06T 7/557; G06T 2200/21; G06T 2207/10144; G06T 2207/20056; G06T 2207/20068; G06T 2207/20228; G06V 10/16; G06V 10/42; G06V 10/431; G06V 10/89; H04N 23/95; H04N 23/957; H04N 25/615; H04N 23/682
See application file for complete search history.

(56) References Cited

U.S. PATENT DOCUMENTS

| | | | | |
|---|---|---|---|---|
| 2010/0246989 | A1* | 9/2010 | Agrawal | G06T 5/20 382/255 |
| 2012/0069225 | A1* | 3/2012 | McCloskey | G06T 5/73 348/241 |
| 2018/0302554 | A1* | 10/2018 | Lelescu | G06T 5/73 |
| 2019/0087943 | A1* | 3/2019 | Maalouf | G06T 5/10 |
| 2020/0120299 | A1* | 4/2020 | Li | G01S 17/36 |
| 2020/0349729 | A1* | 11/2020 | Wu | H04N 13/122 |
| 2022/0417435 | A1* | 12/2022 | Jeon | G06T 5/50 |
| 2022/0417475 | A1* | 12/2022 | Jeon | G06T 5/73 |
| 2024/0273687 | A1* | 8/2024 | Jeon | G06T 5/73 |
| 2024/0311982 | A1* | 9/2024 | Jeon | G06T 5/73 |
| 2025/0168522 | A1* | 5/2025 | El-Yamany | G06T 3/4015 |

OTHER PUBLICATIONS

Veeraraghavan, Ashok et al. "Dappled Photography: Mask Enhanced Cameras for Heterodyned Light Fields and Coded Aperture Refocusing", Jul. 29, 2007, ACM TOG, vol. 26, No. 3. DOI: <https://doi.org/10.1145/1276377.1276463>. (Year: 2007).*
McCloskey, Scott, et al., "Design and estimation of coded exposure point spread functions", IEEE Transactions on Pattern Analysis and Machine Intelligence, vol. 34, No. 10, Oct. 2012, (p. 2071-2077).
Hahne, Christopher, et al., "Baseline and triangulation geometry in a standard plenoptic camera", International Journal of Computer Vision, arXiv:2010.04638v2, Jan. 20, 2021, (14 Pages in English).
Korean Office Action Issued on Mar. 5, 2024, in Counterpart Korean Patent Application No. 10-2023-0018106 (4 Pages in English, 4 Pages in Korean).
Korean Office Action Issued on Nov. 21, 2024, in Counterpart Korean Patent Application No. 10-2023-0018106 (3 Pages in English, 3 Pages in Korean).

* cited by examiner

METHOD OF DEBLURRING MOTION IN LIGHT FIELD IMAGE AND DEVICE THEREFOR

CROSS-REFERENCE TO RELATED APPLICATIONS

This application claims the benefit of Korea Patent Application No. 10-2023-0018106 filed on Feb. 10, 2023, which are incorporated herein by reference for all purposes as if fully set forth herein.

BACKGROUND

Field

The present disclosure is a method of deblurring a motion in a light field image using coded exposure photography (CEP) based on computational photography to restore an image of a light field (LF).

Related Art

Coded exposure photography (CEP), also known as a flutter shutter, is a method of effectively reducing motion blur in a photograph.

A theoretical background of effectiveness of the CEP is as follows.

A captured image b(x,y) in a spatial domain is defined as shown in Equation 1 below.

$$b(x, y) = h(x, y) * s(x, y) + \eta(x, y) \quad \text{[Equation 1]}$$

When this is converted into a frequency domain, Equation 2 below is obtained.

$$B(u, v) = H(u, v)S(u, v) + N(u, v) \quad \text{[Equation 2]}$$

Image deblurring based on this is defined as shown in Equation 3 below.

$$\hat{s} = \mathcal{F}^{-1}\left\{S(u, v) + \frac{N(u, v)}{H(u, v)}\right\} \quad \text{[Equation 3]}$$

Meanings of respective symbols in Equations 1 to 3 are as follows.

$b(x, y)$:Captured image. $\left(\overset{\mathcal{F}}{\leftrightarrow} B(u, v)\right)$ $n(x, y)$:Noise. $\left(\overset{\mathcal{F}}{\leftrightarrow} N(u, v)\right)$ $h(x, y)$:Point spread function $(PSF)$. $\left(\overset{\mathcal{F}}{\leftrightarrow} H(u, v)\right.$ $\mathcal{F}$:Discrete Fourier transform $(DFT)$.

$s(x, y)$:*Latent image.* $\left(\overset{\mathcal{F}}{\leftrightarrow} S(u, v)\right)$ $\mathcal{F}^{-1}$:Inverse discrete Fourier transform $(IDFT)$ Incidentally, as schematically illustrated in FIG. 1, when DFT is performed in a case where an exposure time of a shutter is kept constant according to a traditional scheme, PSF(H(u,v)) in a spatial frequency domain has a value of "0", and thus, noise N(u,v) increases in a deblurring process.

On the other hand, since PSF(H(u,v)) does not have the value of "0" in the spatial frequency domain when CEP is applied as schematically illustrated in FIG. 2, noise is not amplified unlike a traditional scheme and, as a result, it is possible to effectively deblur a motion.

Meanwhile, it is effective to apply a motion deblurring technology called coded exposure photography (CEP) in an environment where a speed and direction are controlled. This is because code that is a core of a CEP technology is optimized and generated on the basis of a single motion given in a scene in the related art.

However, even in an environment where a speed and direction are given, a 3D image to which a depth rather than a 2D data axis has been added is acquired in the case of a light field image in which 3D data is acquired, and thus, a motion may be different for each sub-aperture image of the light field image. In this case, it is more difficult to predict a motion that will occur as compared with that in a general camera that acquires existing 2D data, and therefore, it is difficult to apply a CEP technology to the light field image.

SUMMARY

An object of the present disclosure is to effectively deblur a motion by applying CEP to a light field image.

In order to solve the above technical problem, an embodiment of the present disclosure is a method for deblurring a motion in a light field image in a processing device including at least one processor, the deblurring method including: a first step of modeling PSF for a sub-aperture image of an acquired light field image on the basis of optical parameters; and a second step of deriving an optimization code on the basis of the obtained PSF of each sub-aperture image.

According to the present disclosure, it is possible to provide a clearer image to a user of a light field camera by applying a CEP technology optimized for existing 2D imaging to a light field image in which 3D data is acquired. This makes it possible to provide clearer data in which a motion has been deblurred by using a 3D light field camera in various fields, such as medical/bio fields that require precise data.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

DESCRIPTION OF EXEMPLARY EMBODIMENTS

Figure 1:
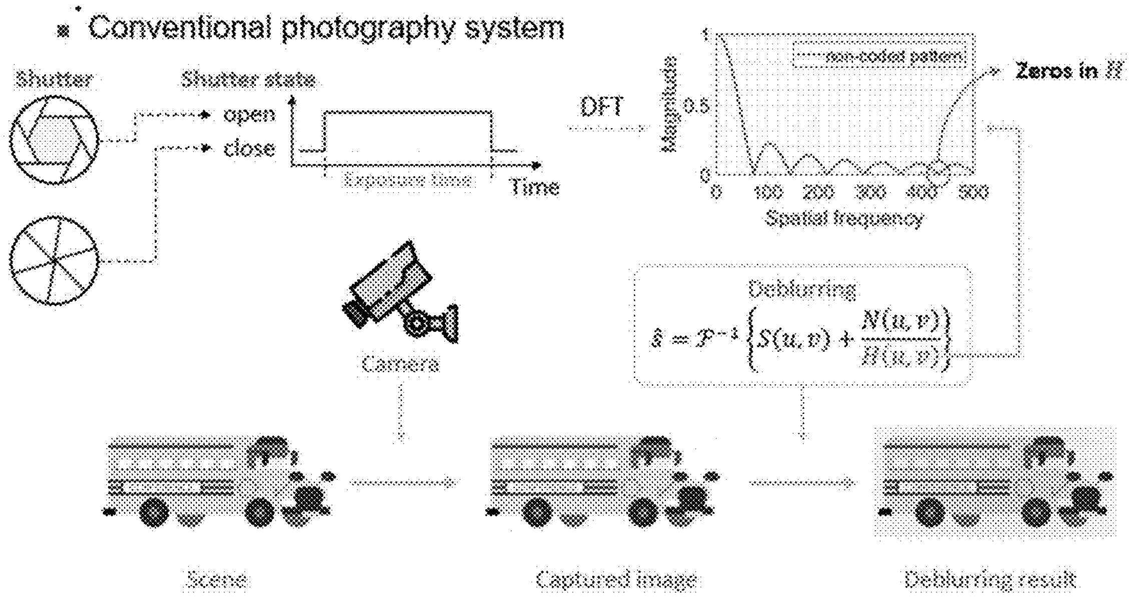
FIGS. 1 and 2 are schematic diagrams illustrating a deblurring technology.

Hereinafter, embodiments of the present disclosure will be described in detail with reference to the drawings. However, detailed descriptions of known functions or configurations that may obscure the gist of the present disclosure are omitted in the following description and accompanying drawings. In addition, throughout the specification, 'including' a certain component does not mean excluding other components unless specifically stated to the contrary, but rather means that other components may be further included.

Further, terms such as first and second may be used to describe various components, but the components should not be limited by the terms. The terms may be used for the purpose of distinguishing one component from another component. For example, a first component may be named a second component, and similarly, the second component may also be named the first component without departing from the scope of the present disclosure.

The terms used in the present disclosure are only used to describe specific embodiments and are not intended to limit the present disclosure. Singular expressions include plural expressions unless the context clearly dictates otherwise. In the present application, it should be understood that terms such as "include" or "comprise" are intended to designate the presence of described features, numbers, steps, operations, components, parts, or combinations thereof, but do not exclude in advance a likelihood of the presence or addition of one or more other features, numbers, steps, operations, components, parts, or combinations thereof.

Unless specifically defined otherwise, all terms used herein, including technical or scientific terms, have the same meaning as generally understood by those skilled in the art to which the present disclosure pertains. Terms such as those defined in generally used dictionaries should be construed as having meanings consistent with meanings in the context of the related technology, and should not be construed as having ideal or excessively formal meanings unless clearly defined in the present application.

Hereinafter, the present disclosure to be described relates to a method of effectively deblurring a motion in a light field image using CEP, and more particularly, to a method of effectively optimizing code in an environment where distance information between a camera sensor and an object is known.

CEP modulates a temporal domain sequence of light received by an image sensor of a camera by controlling a shutter, external lighting, or the like of the camera for an exposure time. In this case, since a motion in an image is modulated according to a sequence of the shutter or a light source, a key technology is to control the external shutter or light source so that good reversibility of the modulated motion is obtained.

Incidentally, the CEP technology has been developed for general 2D cameras and has been applied to various fields to date. However, since the technology is optimized for a specific motion, different motions are generated in each sub-aperture image with multiple viewpoints, such as a light field image, and thus, there is a problem that it is difficult to generate a single code optimal for each motion, which is solved in the present disclosure.

Figure 3:
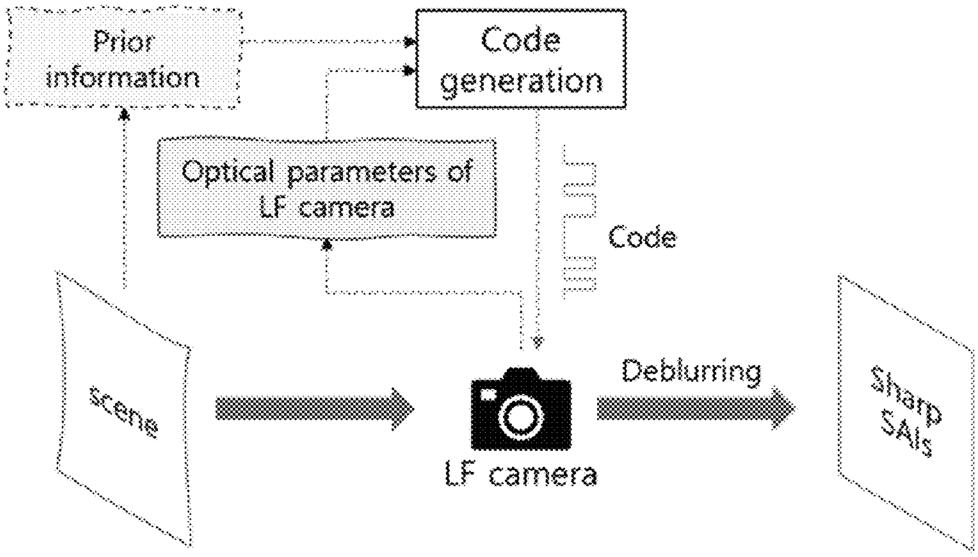
FIG. 3 is a conceptual diagram illustrating the present disclosure.
Figure 4:
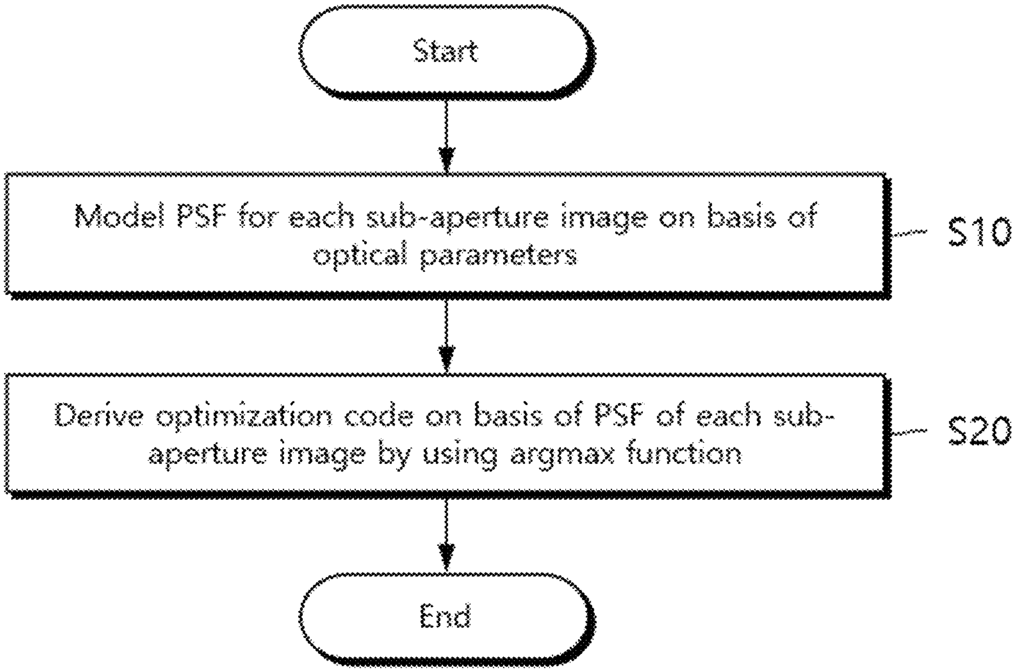
FIG. 4 is a diagram illustrating a sequence of a method of deblurring a motion in a light field image according to an embodiment.

FIG. 3 is a conceptual diagram illustrating the present disclosure, and FIG. 4 is a diagram illustrating a sequence of a method for deblurring a motion in a light field image according to an embodiment.

Referring to FIG. 3, in the present disclosure, the light field camera derives PSF of sub-aperture images (SAIs) of a light field image acquired on the basis of prior information on a motion of a scene (for example, PSF of a previously acquired frame) and optical parameters of the light field camera for motion deblurring of the image, and deblurs the light field image acquired with an optimization code derived on the basis of the derived PSF of the sub-aperture image to acquire a clear image.

The deblurring method of the embodiment includes a step (S10) of modeling the PSF of each sub-aperture image of the acquired light field image on the basis of the optical parameters, and a step (S20) of deriving the optimization code on the basis of the obtained PSF of each sub-aperture image. Here, the optimization code is code that is used when the light field image is modulated (into a phase frequency domain) in a process of acquiring the light field image, and is a value that is equally applied to all the sub-aperture images.

Hereinafter, the respective steps will be described in detail, and step (S10) of modeling the PSF for each sub-aperture image on the basis of the optical parameters will be first described with reference to FIGS. 5 and 6.

Figure 5:
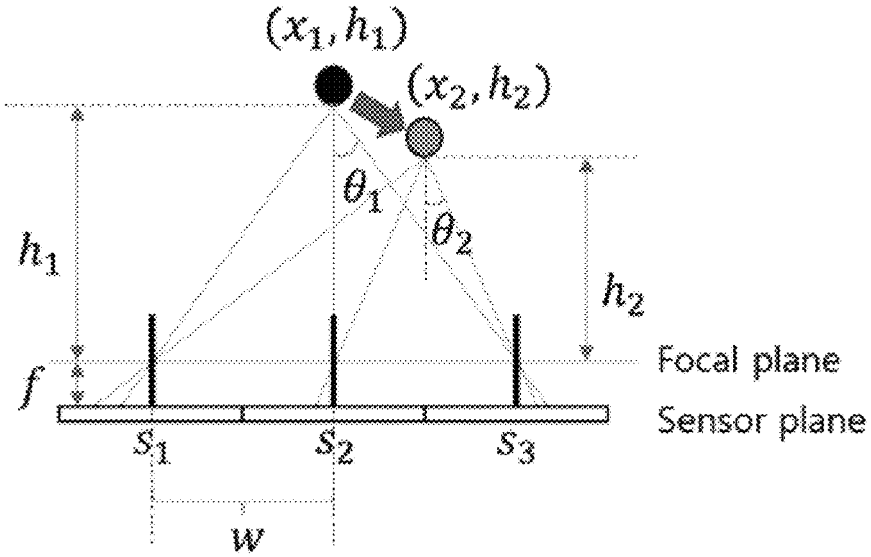
FIGS. 5 and 6 are schematic diagrams illustrating a method of modeling PSF of each sub-aperture image in the light field image.
Figure 6:
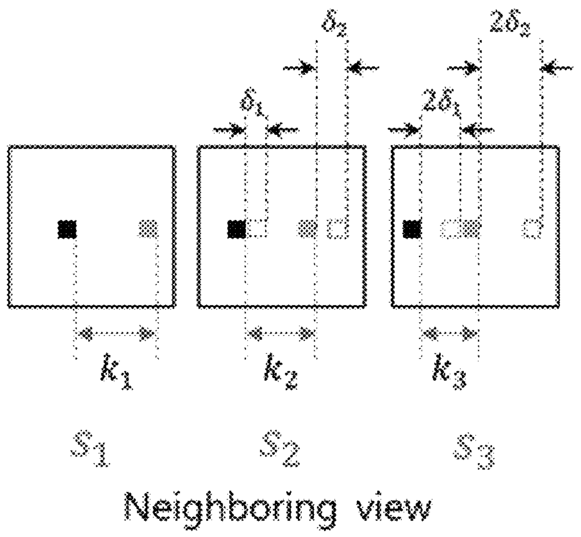

In FIGS. 5 and 6, it is assumed that the light field image has three sub-aperture images $S_1$ to $S_3$, and a motion of an object is a motion without movement in a y-axis direction on three-dimensional axes x, y, and h.

In FIGS. 5 and 6, a first position (x1, h1) when an object first starts moving is indicated in deep dark, and a second position (x2, h2) when the object is located at a last moment of the exposure time is indicated arbitrarily light dark in order to more easily describe movement of the same object.

In FIG. 6, a disparity δ between sub-aperture images can be expressed by Equation 4 below, which is presented in the paper "Baseline and triangulation geometry in a standard plenoptic camera" published on Jan. 20, 2021.

$$\delta = -f\tan(\theta) + \frac{f}{h}W \quad \text{[Equation 4]}$$

$\ominus_n$: Angle between a midpoint of a focal plane located at an entire surface of each of the sub-aperture image $S_1$ to $S_3$ and the object at an object position of deep dark position; Tilt angel of two view's optical axis f: Distance between the focal plane and a sensor; Focal length h: Distance between the focal plane and the object; Depth of the object W: Distance between midpoints of adjacent sub-aperture images; Interval between adjacent sub-aperture images δ: Disparity with a position of a previous frame for the same pixel in the adjacent sub-aperture image According to Equation 4, when first and last positions of the object and a depth h are known, and theta (⊖) is also known, a motion blur (PSF) of each sub-aperture image can be inferred.

In other words, distances k1 to k3 between green points and light dark points in FIG. 6 correspond to the motion blur. It is to be noted that, since it is assumed in advance that there is no motion to a y-axis, the motion is a motion parallel to an x-axis of a lenslet image, this is assumed to give description in a simple form, but the motion can be expanded to a 3D motion.

Each sub-aperture image is defined as $s_n$, and the blur in the sub-aperture image is defined as $k_n$, where n is an index of the sub-aperture image and $n \in [1, \ldots, N]$. In the description of the drawing, N=3 since there are three sensors. When $\ominus$ for a position of an object moving over time is different, a length of the blur may be different, and this can be expressed as shown in Equation 5.

$$k_n = k_1 + (n-1)(\delta_1 - \delta_2) \quad \text{[Equation 5]}$$

According to Equation 5, when the object does not move, there is only $\ominus_1$ as $\ominus$. On the other hand, when the object moves and $\ominus_2$ is generated, motion blur occurs for each of the sub-aperture images $S_1$ to $S_3$, and the motion blur (or PSF) of each sub-aperture image can be obtained by using Equation 5.

Hereinafter, a step (S20) of deriving the optimization code through an argmax function on the basis of the obtained PSF of each sub-aperture image in the deblurring method of an embodiment will be described.

A case where, when the optical parameters are known, the PSF of each sub-aperture image can be obtained from Equations 4 and 5 in the first step (S10) has been described.

Thus, since PSF of each of the sub-aperture images $S_1$ to $S_3$ can be modeled in advance, an algorithm for generating an optimal code for all the sub-aperture images can be precisely applied. Optimization of the code is performed through reversibility analysis of PSF modulated with the code, and a code optimization algorithm for a large number of PSFs precisely predicted by using Equations 4 and 5 above is shown in Equation 6 below.

$$\operatorname{argmax}_U \left( \frac{\sum_{n=1}^{N} \min\left(\left|F\left(g_n^{CEP}\right)\right|\right)}{N} \right) \quad \text{[Equation 6]}$$

Here, U denotes a code to be optimized, F denotes discrete Fourier transform (DFT), g denotes PSF, and $g_n^{cep}$ is PSF modulated with $\cup$ and means coded PSF of an n-th sub-aperture image motion blur. Here, g can be precisely modeled by using Equation 5, as described in the first step (S10).

Figure 2:
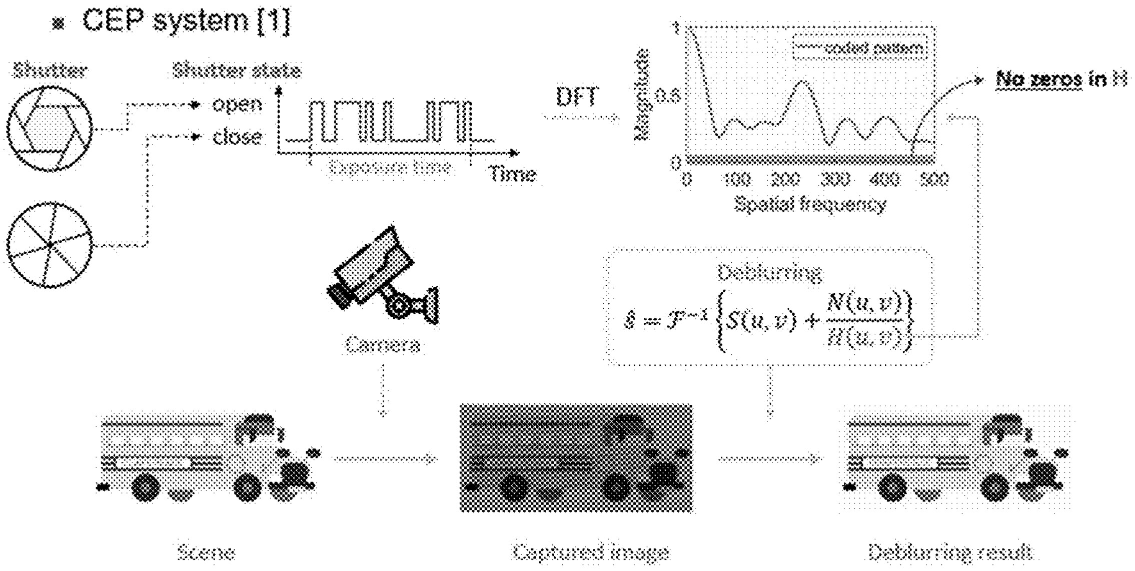

Meanwhile, a core of CEP is to modulate an exposure pattern of the shutter. As illustrated in FIGS. 1 and 2, a best code of CEP is code for maximizing a minimum value in a spatial frequency domain (Modulated Transfer Function, |F(h)|).

In the present disclosure, this is considered in order to derive the optimization code through the argmax function. More specifically, code optimization is performed in an iterative manner in a code candidate group ($U \in Q$). Therefore, in Equation 6, an average value is calculated by dividing a minimum value of an MTF graph (spatial frequency domain) of $g_n^{cep}$ modulated with U in each sub-aperture image (SAI) by N. The argmax function refers to a function for maximizing an average value of the minimum value in the MTF function of motions modulated with U.

Figure 7:
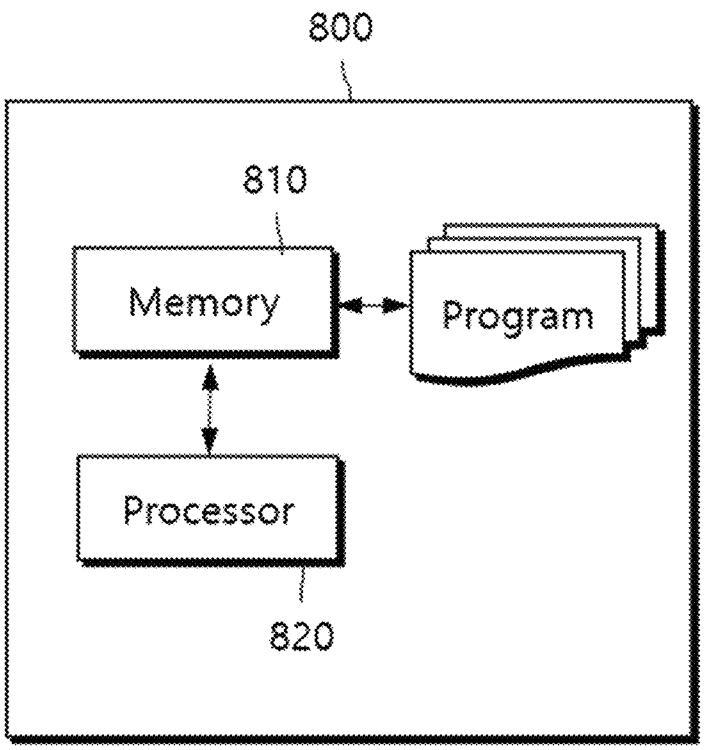
FIG. 7 is a diagram illustrating a configuration of a computing device for deblurring a motion in the light field image according to an embodiment of the present disclosure.

FIG. 7 is a block diagram illustrating a processing device 800 that deblurs a motion in a light field image, a series of processes of deblurring a motion by applying CEP in the light field image according to the present disclosure described above are reconstructed in terms of a hardware configuration, and the processing device 800 may be a light field camera or a light field microscope. Therefore, only an overview of functions and operations of respective components will be described here in order to avoid duplication of description.

A memory 810 is configured to store a series of programs that implement the method of deblurring the motion in the light field image described above. The deblurring method of the embodiment described above is programmed in various computer-readable languages and stored in the memory 810.

A processor 820 is configured to execute the program for deblurring a motion by applying CEP in the light field image using the program stored on the memory 810. Here, the program executed by the processor 820 includes instructions for modeling the PSF for each sub-aperture image of the acquired light field image on the basis of the optical parameters, and deriving the optimization code through the argmax function on the basis of the obtained PSF of each sub-aperture image.

Meanwhile, the embodiments of the present disclosure can be implemented as computer-readable code on a computer-readable recording medium. The computer-readable recording medium includes all types of recording devices that store data that can be read by a computer system.

Examples of the computer-readable recording medium include a ROM, a RAM, a CD-ROM, a magnetic tape, a floppy disk, and optical data storage device. Further, the computer-readable recording medium can be distributed to computer systems connected to a network, and computer-readable code can be stored and executed in a distributed manner. Functional programs, code, and code segments for implementing the present disclosure can be easily inferred by programmers in the technical field to which the present disclosure pertains.

The present disclosure has been described focusing on various embodiments. Those skilled in the art will understand that the present disclosure can be implemented in a modified form without departing from the essential characteristics of the present disclosure. Therefore, the disclosed embodiments should be considered from an illustrative perspective rather than a restrictive perspective. The scope of the present disclosure is indicated in the claims rather than the foregoing description, and all differences within the equivalent scope should be construed as being included in the present disclosure.

What is claimed is:

1. A method for deblurring a motion in a light field image in a processing device including at least one processor, the deblurring method comprising:

a first step of modeling PSF for each sub-aperture image of an acquired light field image on the basis of optical parameters;

a second step of deriving an optimization code on the basis of the obtained PSF of each sub-aperture image; and a third step of deblurring the acquired light field image by applying the derived optimization code to the acquired light field image to generate a deblurred light field image, wherein the optimization code is a code that maximizes an average value of reversibility of PSFs of all sub-aperture images of the acquired light field image.

2. The deblurring method of claim 1, wherein the first step includes expressing a disparity $\delta$ between the sub-aperture images as shown in Equation 1 below, wherein variables θ, f, h and W each denote a tilt angle of two views' optical axes (θ), a focal length (f), a depth of the object (h) and an interval between adjacent sub-aperture images (W), respectively.

$$\delta = -f\tan(\theta) + \frac{f}{h}W \quad \text{[Equation 1]}$$

3. The deblurring method of claim 2, wherein a length Kn of motion blur in each sub-aperture image is expressed as Equation 2 below, and wherein Kn denotes a motion blur length, where n denotes an index of the sub-aperture image, and $\delta_1$ and $\delta_2$ respectively denote disparities corresponding to first and second object positions during an exposure time.

$$k_n = k_1 + (n-1)(\delta_1 - \delta_2) \quad \text{[Equation 2]}$$

4. The deblurring method of claim 1, wherein, in the second step, the optimization code is code for maximizing an average value obtained by dividing a minimum value in an MTF graph obtained through the PSF of each sub-aperture image modeled in the first step by the number of sub-aperture images.

5. A non-transitory computer-readable recording medium having a program recorded thereon, the program causing a computer to execute the deblurring method according to claim 1.

6. A computing device comprising:

a memory configured to record a program for deblurring a motion in a light field image; and a processor configured to execute the program, wherein the program executed by the processor:

models PSF for each sub-aperture images of an acquired light field image on the basis of optical parameters;

derives an optimization code on the basis of obtained PSF of each sub-aperture image; and applies the derived optimization code to the acquired light field image to generate a deblurred light field image, and wherein the optimization code is a code that maximizes an average value of reversibility of PSFs of all sub-aperture images of the acquired light field image.

7. The computing device of claim 6, wherein a disparity δ between the sub-aperture images is expressed as shown in Equation 3 below, wherein variables θ, f, h and W each denote a tilt angle of two views' optical axes (θ), a focal length (f), a depth of the object (h) and an interval between adjacent sub-aperture images (W), respectively.

$$\delta = -f\tan(\theta) + \frac{f}{h}W \quad \text{[Equation 3]}$$

8. The computing device of claim 7, wherein a length (Kn) of motion blur in each sub-aperture image is expressed as shown in Equation 4 below, and wherein Kn denotes a motion blur length, where n denotes an index of the sub-aperture image, and $\delta_1$ and $\delta_2$ respectively denote disparities corresponding to first and second object positions during an exposure time.

$$k_n = k_1 + (n-1)(\delta_1 - \delta_2) \quad \text{[Equation 4]}$$

9. The computing device of claim 6, wherein the optimization code is code for maximizing an average value obtained by dividing a minimum value in an MTF graph obtained through the PSF of each sub-aperture image modeled by the processor by the number of sub-aperture images.

* * * * *